United States Patent
Tsang et al.

(10) Patent No.: US 9,669,599 B1
(45) Date of Patent: Jun. 6, 2017

(54) GALVANIC-CORROSION-RESISTANT COMPOSITE MATERIAL HAVING A SELF-EXTINGUSHING BARRIER LAYER

(71) Applicant: The Government of The United States of America, as represented by the Secretary of the Navy, Washington, DC (US)

(72) Inventors: Joseph W. Tsang, Ridgecrest, CA (US); Raymond J. Meilunas, Lexington Park, MD (US); Benjamin Harvey, Ridgecrest, CA (US); Matthew Davis, Ridgecrest, CA (US)

(73) Assignee: The Government of the United States of America as Represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 14/121,015

(22) Filed: Jan. 29, 2015

(51) Int. Cl.
*B32B 5/28* (2006.01)
*B32B 37/02* (2006.01)
*B32B 5/22* (2006.01)

(52) U.S. Cl.
CPC .......... *B32B 5/22* (2013.01); *Y10T 428/31547* (2015.04)

(58) Field of Classification Search
CPC    B32B 5/22; B32B 27/06; B32B 27/28; B32B 2262/00; Y10T 428/24994; Y10T 428/31547
See application file for complete search history.

(56) References Cited

U.S. PATENT DOCUMENTS 3,676,200 A * 7/1972 Rembold et al.

OTHER PUBLICATIONS

Guenthner et al., New insights into structure property relationships in thermo. poly. for studies of cocured poly. networks. Macromolecules 2012, 45, 211-220.
Cash, et al. High Tg thermostting resins form resveratrol. Poly. Chem. 2013, 4, 3859.

* cited by examiner

*Primary Examiner* — Carol M Koslow
(74) *Attorney, Agent, or Firm* — Charlene A. Haley

(57) ABSTRACT

A composite material composition that is simultaneously resistant to fire and galvanic corrosion; and, a method of manufacturing a composite material that has a fire resistant polycyuranate outermost barrier layer in composite structures.

20 Claims, No Drawings

GALVANIC-CORROSION-RESISTANT COMPOSITE MATERIAL HAVING A SELF-EXTINGUSHING BARRIER LAYER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a composite material having an outermost barrier layer that is self-extinguishing and resistant to galvanic corrosion.

DETAILED DESCRIPTION OF EMBODIMENTS OF THE INVENTION

The invention generally relates to a composite material having an outermost barrier layer that is self-extinguishing and resistant to galvanic corrosion.

A polymer matrix composite (PMC) is a multi-ply (or multi-layer) laminate wherein the plies (or layers) have polymer matrix material binding reinforcing fibers. The term 'matrix' refers to material resulting from curing a resin or polymerizing a monomer. The term 'uncured resin' may be used interchangeably with the term 'monomer.' The term 'cured' may be used interchangeably with the term 'polymerized.' PMC structures on Department of Defense (DoD) aircraft are vulnerable to fire damage, especially in fires involving fuels.

Bismaleimides (BMI) are commercially-available resins used in structural parts for DoD vehicles because they process similarly to epoxy resins while providing higher glass transition temperatures that are important for high-performance structural composites. However, cured BMI matrix materials are hydrophilic and when used in humid environments, such as in naval environments, result in galvanic corrosion to adjacent metal parts, especially when BMI composites are reinforced with electrically-conductive carbon-based fibers and/or graphite fibers. BMI monomers are produced by condensing a diamine with maleic anhydride. While they can be processed in similar fashion to epoxy resins (350° F. (177° C.) cure), higher glass transition temperatures and superior properties can be achieved from post-curing (450° F. (232° C.)). These properties include a 400-450° F. (204-232° C.) continuous use temperature and a glass transition of ~500° F. (260° C.). BMIs are widely used in composites as a prepreg matrix in manufacturing electrical printed circuit boards and structural composites. They are also used as a coating material and as the matrix in glass reinforced pipes, particularly in high temperature and chemical environments.

Laminating BMI-carbon fiber composites with an outermost ply (or layer) having a self-extinguishing cyanate-ester (CE) matrix material and electrically non-electrically conductive fibers (specifically excluding graphite and carbon fibers), has been found to alleviate galvanic corrosion at the interface of adjacent metal parts. At the same time the self-extinguishing CE layer reduces the composite's vulnerability in fires. A multi-ply BMI composite structure having an outer cured CE barrier layer (or outer CE ply) is an embodiment of the invention, and furthermore, a method for fabricating such a composite structure is another embodiment of the invention. The use of a non-BMI based composite structure as a substrate for application of the CE ply is a further embodiment of the invention. The self-extinguishing property of the CE matrix material is attributable to the crosslinked network and the high char yield obtained at high temperatures. The resistance to galvanic corrosion is attributable to electrically non-conductive, non-carbon based fibers to reinforce this polycyanurate layer. Thus this CE layer bonded on a cured BMI composite structure provides both resistance to fire and galvanic corrosion. It is further anticipated that multi-ply composite structures using other thermoset and thermoplastic resins can achieve substantial improved material property of resistance to fire and galvanic corrosion by using self-extinguishing cyanate-esters as the outermost layer.

Polycyanurates are polymerized from cyanate-ester (CE) monomers with or without the use of catalysts. In the presence of chopped or continuous fibers and CE monomers, the mixture polymerizes to form composite structures.

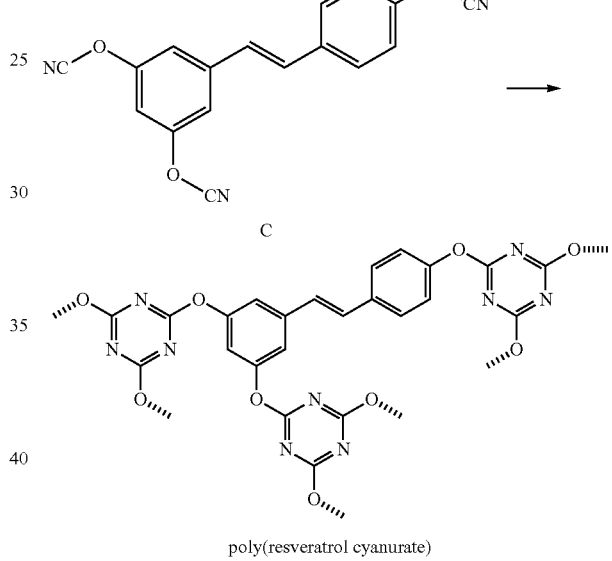

poly(resveratrol cyanurate)

Other cured polycyanurate resins are also embodiments of the invention. PMCs having inner plies of a BMI or other resin matrix, including plies of BMI matrix binding carbon fibers and/or graphite, fibers, having an outermost CE ply (or barrier layer) having crosslinked polycyanurate, which may include electrically non-conductive fibers, but does not include graphite fibers or other carbon-based fibers, is an embodiment of the invention.

Conductive fibers, such as graphite fibers and other carbon-based fibers, may have surface electrical resistivity less than about $10^5$ Ohms/square, and when imbedded in a BMI matrix, the bulk electrical resistivity may be less than about $10^4$ Ohms/cm, which creates the problem of galvanic corrosion. On the other hand, non-carbon-based fibers that have surface electrical resistivity greater than about $10^6$ Ohms/square, and when imbedded in a CE polymer matrix, the bulk electrical resistivity may be greater than about $10^5$ Ohms/cm that render the material non-conductive and thus resist corrosion to the adjacent metal surfaces. Furthermore, the cured cyanate ester monomers (CE matrix materials) embodied in the invention form a higher percentage of char than BMI matrix material when exposed to heat and fire.

A PMC matrix material may be prepared by curing a multifunctional monomer, which may optionally be blended with other additives before curing. The multifunctional monomer is normally a thermosetting material that becomes a three-dimensionally crosslinked matrix (a binding material) after it is cured. The curing process may be accomplished by the application of heat. A curing catalyst may be added to the monomer to accelerate the curing rate at a given temperature. Liquid or solid CE monomers may be blended with low melting CE monomers to make prepeg and then cured to form structural composites. Other additives including fillers and fire-retarding agents may also be added in the CE monomers.

Cured cyanate esters (CE's) are also called polycyanurates, polycyanurate resins and crosslinked polycyanurates. CE's have considerably lower moisture absorption than other common (non-fluorinated) resins, such as BMI resin or epoxy resin. The moisture uptake of CE's in boiling water is on the order of about 1% or less, compared to over 2.0% for epoxy resins. Having lower moisture absorption lowers the moisture content of the PMC matrix material and affords higher galvanic corrosion resistance.

Composite materials are normally laminated materials having two or more plies including reinforcing fiber. The fiber may be, for example, in a chopped, continuous, uniaxial, biaxial, non-woven matte, woven fabric, stitched fabric, knitted fabric, and honeycomb core configuration. The 'honeycomb' core is a light-weight reinforcing/rigidifying material (and/or ply), and the honeycomb walls may include electrically non-conductive fibers.

Methods used to make flame-resistant (flame-retardant and/or self-extinguishing) composite materials include blending additives and inert fillers with monomers before curing.

Blending flame-retarding additives, fillers and compounds in multifunctional cyanate-ester (CE) monomers (or resins) that are used to form matrix materials is an embodiment of the invention. Examples include talc, calcium carbonate, aluminium nitride, SiC, silica, zinc borate, other borates, molybdates, antimony trioxide, melamine phosphate and aluminum trihydrate. Other organic compounds having bromine, phosphate, boron, sulfur and halogen atoms may be used.

Ceramic fibers can withstand temperatures of at least 1,000° C. and offer fire resistance when used in PMC's, which is an embodiment of the invention. The chemical composition of electrically non-conductive fibers embodied in the invention include silicon oxide, S-glass, zirconium oxide, other metal oxides, boron, boron nitride, other nitrides, basalt, rock wool, other ceramic materials and combinations thereof. If the surfaces of fibers are not hydrophobic as received, there are well-known surface treatments that may be used to increase the electrical resistivity of the fibers. Such surface treatments include contacting the fiber (and also other fillers if they are used) with hydrophobic silanes, titanates, and the like. Such treatments are useful in preventing galvanic corrosion.

In methods embodied in the invention the reinforcing fibers are pre-impregnated with liquid monomer. Therefore, before the monomer (or resin blend) is cured, it is infused around the fibers (in the fiber preform) to wet the fibers and eliminate voids; the resulting ply (or layer or sheet) is called a 'prepreg layer' or a 'prepreg ply' or simply a 'prepreg'. Prepreg plies are normally stacked up. This is called the 'layup' process. Then this multi-ply 'prepreg' is cured to form a PMC (also called a multi-ply laminate, a laminate or a composite sheet).

A manufacturing method (or a repairing process) embodied in the invention is to layup a first uncured ply (called the first prepreg) on any type of multi-ply laminate (cured or uncured laminate) so that the uncured prepreg conforms to and wets the multi-ply laminate and thus becomes associated with the multi-ply laminate. The multi-ply laminate may have BMI resin or other resins associating with graphite and/or other carbon-based fiber (such as a BMI PMC part in the field). This associated assembly (including the first prepreg and the multi-ply laminate) is herein called the 'second prepreg.' The second prepreg is cured to form an improved PMC (or a repaired PMC). Such a method, in which the first prepreg has a cyanate-ester ply including at least one multifunctional cyanate-ester monomer associating with at least one electrically non-conductive fiber having chemical composition selected from the group consisting of silicon oxide, S-glass, zirconium oxide, other metal oxides, boron nitride, other nitrides, mineral wool, other ceramic material and combinations thereof, is useful in producing an improved PMC laminate that has both fire-resistance and higher resistance to galvanic corrosion. Such improved PMC and methods to produce it are embodiments of the invention.

Prepreg tape is an example of a unidirectional ply wherein the fibers are aligned in one direction in the ply. A common method of manufacture of such a prepreg ply is to draw collimated, dry strands of fiber into an impregnation machine, wherein using heat and pressure, liquid monomer (or hot melted resins) wet the fiber strands 'impregnating' the fibers and forming the so-called prepreg tape. Tape products have high strength in the fiber direction and little strength across the fibers.

The fibers in fabrics and woven cloth are bidirectional. Fabric constructions offer more flexibility for building complex shapes (the layup) than unidirectional tapes offer. Fiber cloth (or fabric, or a 'dry ply') is impregnated with thermosetting resins (liquid monomers), for example, by a solution or a hot-melt process. A dry ply is the fiber fabric before it is infused with monomer (or resin). A plain weave fabric is an example of a bidirectional ply orientation. Knitted or stitched fabrics may offer three-dimensional mechanical advantages. Fiber placement can be straight or unidirectional without the over/under turns of woven fabrics. The fibers are held in place by stitching with fine yarns or threads after preselected orientations of one or more layers of dry plies. Dry plies of fiber can be positioned and shaped (the lay-up process) before the monomer is infused into the fabric plies. The positioning and shaping process can be automated and performed by a machine or robot.

Properties of composite laminates, such as stiffness, dimensional stability, strength, and fire resistance, depend on the stacking sequence of the plies. The stacking sequence is the distribution of types of plies (as well as the fiber orientations in each ply) through the laminate thickness direction. As the number of plies increases, more stacking sequences are possible.

PMC's having plies of bis-maleimide (BMI) matrix material (called BMI plies) or plies prepared with other resins reinforced with carbon or graphite fibers cause galvanic corrosion with adjacent metal surfaces in the presence of other electrolytes such as seawater. Placing and curing one or more cyanate ester (CE) plies (or layers) on the outside of such a PMC forms an outermost layer that protects the PMC against galvanic corrosion in navy operating environments and is an embodiment of the invention.

Cyanate-ester resins and bismaleimide resins (BMI) high glass transition temperatures and are tougher than epoxy resins. Other types of resins and polymers may be used in inner plies of PMCs and laminated composite materials embodied in the invention. Examples of such other types of resins are epoxy, phenolic, vinylester, polyester, lignin-based resin, imide, aramid, polyimide, polyether-imide, polyamide, and polyether-ether-ketone. Most of these resins are suitable for standard autoclave processing, injection molding, resin-transfer molding, sheet molded compound (SMC) and other methods of processing fiber-resin prepreg.

The majority of exposed BMI composite surfaces having carbon fibers are susceptible to fire damage and galvanic corrosion. Placing outer plies consisting of epoxy-fiber glass on BMI composite parts has been used to mitigate galvanic corrosion, but epoxy resins do not provide adequate fire resistance. Hydrophobic flame-resistant cyanate ester materials (plies) placed on the outside of BMI PMC's remedy that deficiency and are embodiments of the invention.

Multi-functional protection (a barrier coating that is both fire resistant and resistant to galvanic corrosion) can be obtained by a fabrication method that places self-extinguishing and low moisture uptake plies having cyanate-ester (CE) resin (or CE matrix) on the outer surfaces of composites having inner plys including BMI or other resin based matrices.

Lightweight polymer matrix composites (PMC) are an enabling structural material for DoD aircraft that provide a combination of high strength-to-weight ratio, good fatigue properties, and saltwater corrosion resistance. However, PMC's are vulnerable to fire damage, especially from fuel fires. Both the DoD and the Federal Aviation Administration (FAA) have invested in developing fire resistant polymers over many years.

Embodiments of the invention incorporate specific self-extinguishing CE resins (multifunctional CE monomer blends) in the outer plies of BMI-composite components by conventional fabrication process that result in a fire-resistance barrier/coating on BMI-composite structures. The advantages of this approach are three fold: (1) it extends the aircraft's composite structural integrity and service life by reducing the fire vulnerability to damage, (2) it can use existing BMI-composite fabrication processes that are already qualified by the DoD, and (3) it enables significant cost savings in repair of parts versus scrap/replacement (i.e., a replacement cost can be 10× more than that of a repair cost). Furthermore, at least two orders of magnitude of improvement in fire burn-through resistance is anticipated by this approach.

More specifically, this invention discloses recent developments in multifuctional cyanate-ester (CE) monomers (and resin blends) and concurrent developments in structural composite repair methods using cyanate-ester resins. Several cyanate-ester monomers have been synthesized and cured to resins that show high % char yield in air at 600° C. (>40% char yield based on the neat resin). Additional testing at the FAA indicated that tris(cyanate) ester resins derived from resveratrol provide the lowest heat release capacity and heat of combustion (unpublished results) for all recorded data on organic polymer matrix materials. Other examples include a silicon containing cyanate ester resin (SiMCy) with higher char yield in air compared to that of dicyanate esters of Bisphenol A (BADCy) (see Guenthner et al., *Macromolecules* 2012, 45, 211-220). Silicon dioxide and other silicon species are formed during fire exposure at the surface of the composite material and protect the underlying resin from further burning. As such these cyanate-ester resins are considered "self-extinguishing." Processes have been developed to repair bismaleimide (BMI) composite structures using cyanate-ester resins. Strong bonding between the damaged composite interface and the repair patch has been verified by mechanical testing. An added benefit for some embodiments, are that these CE resins do not contain halogens. Thus, the cyanate-ester-based composite materials that are embodiments of the invention meet emerging DoD environmental requirements on flame retardants for composites and eliminate toxic gas vulnerability to crew during cabin airframe fires.

Commercially available CE prepegs and liquid resins (for example, from TenCate and Lonza) are co-cured with dissimilar thermoset resins. Mixed resins comprising a CE and one or more other resins with high fire resistance properties (high char yield, low heat release and low heat of combustion) are embodiments of the invention.

CE resin systems are formulated in liquid form either directly, by melting, or by mixing and applied/infused into a fiber ply, for example a ply of fiberglass, to form the surface barrier ply (the outermost ply). If a liquid form of the multifunctional CE monomer is not available, film forms are prepared and transferred directly onto the ply (preform) of ceramic fiber via a resin-film infusion technique. For liquid-form monomers (resins), filament-wetting/drawing, tape-wetting/drawing, resin-film infusion, resin-transfer molding, vacuum-assisted resin-transfer molding, injection molding, compression molding, extrusion, sheet-molded compound, conveyor-belt assembly may be used to form the CE ply.

Wet layup and vacuum bagging may be used to place (associate) the CE-fiber ply onto a preformed BMI or other resin-based multi-ply laminate or composite part. Other methods may also be used such as hand layup, machine layup, filament-winding, tape winding, tape placement, automated tape laying, resin-infusion molding, resin-transfer molding, autoclave molding and vacuum-assisted resin-transfer molding. The part may then be heated (cured or co-cured) using either autoclave (oven) or out-of-autoclave process. During the composite fabrication process it is important to match the BMI or other composite and CE cure cycles for optimal properties including time to fully cure, the glass transition temperatures ($T_g$) of the neat matrix materials, ply-to-ply adhesion and other mechanical properties. For example, the curing (or post cure window) of the multifunctional CE monomer (or CE resin blend) may be matched to common BMI resins (typically 375-470° F.) to optimize properties of the matrix materials and performance of the composite part.

The CE-BMI/other resin multi-ply composite materials (substrates) are evaluated for fire resistance performance as functions of thermal flux level (i.e. intensity) and exposure duration. The baseline control BMI composites (without the self-extinguishing CE barrier ply) are evaluated for comparison to the BMI composite having an outer self-extinguishing CE barrier layer (outermost ply). Fire damage on these composites is quantitatively measured by mechanical testing. Non-destructive evaluation (NDE) techniques are used to provide a detailed depth profile and effectiveness rating of the fire resistance barrier layer (ply) on the BMI composite structure. The results are as follows:

Initial experimental results to support the invention:

Burn testing on BMI and cyanate ester-composite panels was evaluated for 50 seconds duration. BMI composite panels ignited in the burn test after 50 seconds (@50 sec duration) whereas the CE composite did not ignite under the same burn condition. These results further correlate with char yield data provided in Table 1, which were obtained from thermogravimetric analysis (TGA). When BMI resin is exposed to 600° C. in air, 38% by weight char residue remained while the rest of the mass was lost to combustion.

Under the same testing condition by TGA, all cyanate-ester resins showed higher char yields than that of BMI and epoxy resins, indicative of the fire resistance properties of this class of thermoset resins. More importantly, specific CE chemical structures such as those derived from resveratrol showed very high char yield, 70% by weight. Highly fire-resistant CE resins have been uncovered in our laboratory as shown in Example 1—molecules designated as D and E.

Testing at the FAA on fully cured resveratrol CE resins indicated they provide the lowest heat release capacity and heat of combustion among all recorded to date for an organic polymer (Lyon, unpublished results).

The inclusion of foam layers and honey-comb layers (for example, made from phenol foam, balsawood, and Nomex) in the laminates are embodiments of the invention.

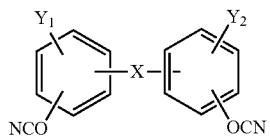

wherein X is selected from the group consisting of methylene, functionalized methylene, ethylene, functionalized ethylene, isopropylene, functionalized isoproplyene, alkylene and functionalized alkylene; wherein at least one $Y_1$ and at least one $Y_2$ are OCN; wherein at least one $Y_1$ and at least one $Y_2$ are independently selected from the group consisting of hydrogen, alkyl, functionalized alkyl, alkenyl, functionalized alkenyl, aryl and functionalized aryl; and wherein said monomer is liquid at temperatures greater than 18° C. and/or has a melting point less than about 150° C.

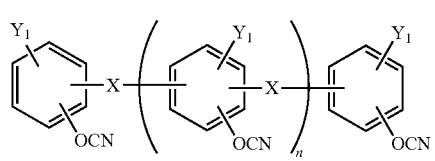

wherein X is selected from the group consisting of methylene, functionalized methylene, ethylene, functionalized ethylene, isopropylene, functionalized isoproplyene, alkylene and functionalized alkylene; wherein at least one $Y_1$ is OCN; wherein at least one $Y_1$ is independently selected from the group consisting of hydrogen, alkyl, functionalized alkyl, alkenyl, functionalized alkenyl, aryl and functionalized aryl; and wherein said monomer is liquid at temperatures greater than 18° C. and/or has a melting point less than about 150° C.

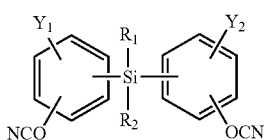

wherein at least one $Y_1$ and at least one $Y_2$ are OCN; wherein at least one $Y_1$, at least one $Y_2$, at least one $R_1$ and at least one $R_2$ are independently selected from the group consisting of hydrogen, alkyl, functionalized alkyl, alkenyl, functionalized alkenyl, aryl, and functionalized aryl; and wherein said monomer is liquid at temperatures greater than 18° C. and/or has a melting point less than about 150° C.

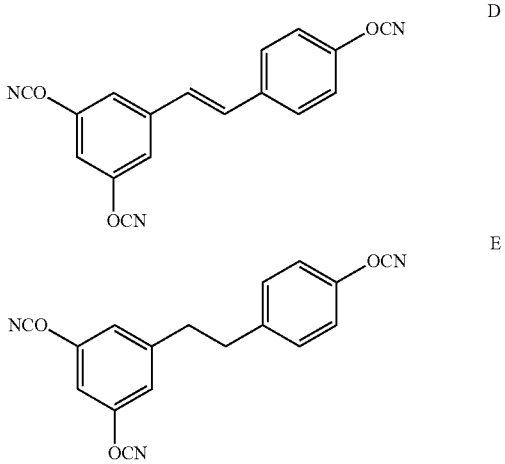

Example 1. Examples of the Cyanate Ester Polymer Matrix Materials

TABLE 1

Glass transition temperatures of cured resins and weight % char yield

| Resins | Tg post cured 350° C. | % Char yield 600° C. in air |
|---|---|---|
| Bis A based epoxy | 235 | 25 |
| BMI | 293 | 38 |
| BADCy | 323 | 25 |
| SiMCy (2) | 267 | 50 |
| TenCateEX1505 | 316 | 59 |
| LonzaPT-30 | 400 | 65 |
| Resveratrol CE (1) | 340 | 71 |
| Hydrogenated resveratrol CE (1) | 334 | 66 |

Embodiments of the invention generally relate to fiber reinforced composite materials including, at least one outermost layer is a polycyanurate matrix having at least one cured cyanate ester monomer associating with at least one non-carbon based fiber(s), at least two inner layers having a fiber reinforced composite, and at least one cure catalyst in the cyanate ester monomers, where the combined polycyanurate/fiber reinforced composite produce a galvanic-corrosion resistant and fire-resistant composite material. Other embodiments of the invention generally relate to methods for manufacturing polymer matrix resin composite materials including, impregnating at least one ply of non-carbon based fiber with a mixture of at least one cyanate ester monomer and at least one cure catalyst, laying at least one cyanate ester prepeg ply onto at least one second ply of fiber composite substrate, applying reduced pressure to the cyanate ester and the substrate, and heating to cure and bond the cyanate ester/ply onto the substrate.

In embodiments, the cured cyanate ester monomers are at least one cure catalyst or thermally cured. In embodiments, the fiber reinforced composite is selected from the group consisting of cured thermosetting resins including bismaleimide (BMI), cyanate esters, end-capped polyimides, other end-capped oligomers, benzoxazines, and epoxies, and thermoplastic resins including polyetheretherketones (PEEK), polycarbonates, polyimides, polyetherimides, polyethersulfones, polyphenyl sulfides, polyamides, thermoplastics, phenolic, vinylester, polyester, lignin-based resin, aramid, imide, polyether-imide, polyimide, and polyether-ether-ketone, and copolymers, and any combinations thereof. In embodiments, the polycyanurate matrix is polymerized from one or more bifunctional or polyfunctional cyanate ester monomers, wherein said one or more bifunctional or polyfunctional cyanate ester monomers are selected from the structural formula A, B, C, D, and E:

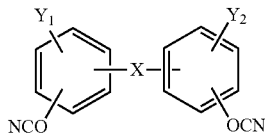

A where X is selected from the group consisting of methylene, functionalized methylene, ethylene, functionalized ethylene, isopropylene, functionalized isopropylene, alkylene and functionalized alkylene, where at least one $Y_1$ and at least one $Y_2$ are OCN, where at least one $Y_1$ and at least one $Y_2$ are independently selected from the group consisting of hydrogen, alkyl, functionalized alkyl, alkenyl, functionalized alkenyl, aryl and functionalized aryl, and where monomer is liquid at temperatures greater than 18° C. and/or has a melting point less than about 150° C.;

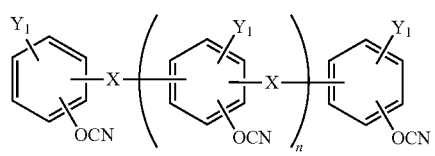

B where X is selected from the group consisting of methylene, functionalized methylene, ethylene, functionalized ethylene, isopropylene, functionalized isoproplyene, alkylene and functionalized alkylene, where at least one $Y_1$ is OCN, where at least one $Y_1$ is independently selected from the group consisting of hydrogen, alkyl, functionalized alkyl, alkenyl, functionalized alkenyl, aryl and functionalized aryl, and where monomer is liquid at temperatures greater than 18° C. and/or has a melting point less than 150° C.;

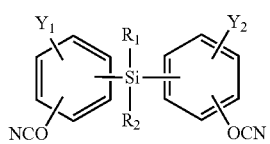

C where at least one $Y_1$ and at least one $Y_2$ are OCN, where at least one $Y_1$, at least one $Y_2$, at least one $R_1$ and at least one $R_2$ are independently selected from the group consisting of hydrogen, alkyl, functionalized alkyl, alkenyl, functionalized alkenyl, aryl, and functionalized aryl, and where monomer is liquid at temperatures greater than 18° C. and/or has a melting point less than about 150° C.

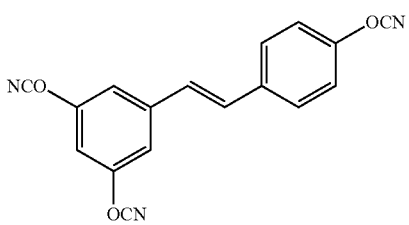

D

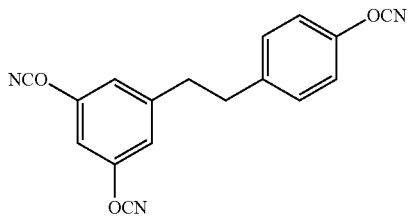

E

In embodiments, the non-carbon based fiber(s) is electrically non-conductive. In embodiment, the outermost layer of the polycyanurate matrix further includes at least one flame-retarding additive selected from a group of organophosphates, metal hydroxides, hydrated metal oxides, other metal mineral carbonates, mineral borates, clays, and halogenated compounds. In embodiments, the non-carbon based electrically non-conductive fiber(s) is selected from the group consisting of silicon oxide, S-glass, E-glass, zirconium oxide, other oxides, boron nitride, nitrides, mineral fibers, ceramic material, and any combinations thereof. In embodiments, at least one non-carbon based fiber(s) occupies a total volume fraction in the range of about 30% to about 80% to the polycyanurate matrix layer. In embodiments, the outermost layer of said polycyanurate matrix including at least one non-carbon based electrically non-conductive fiber is selected from the group consisting of chopped, continuous, uniaxial, tape, biaxial, non-woven matte, woven fabric, stitched fabric, and knitted fabric. In embodiments, the fiber-reinforced composites are cured bismaleimide (BMI) fiber-reinforced composites with carbon-based fibers or are prepegs.

In embodiments, the fiber-reinforced composites are cured bismaleimide (BMI) fiber-reinforced composites with carbon-based fiber(s) selected from the group consisting of chopped, continuous, uniaxial, tape, biaxial, non-woven matte, woven fabric, stitched fabric, knitted fabric and honeycomb structures. In embodiments, the outermost layer of the polycyanurate matrix having a glass transition temperature greater than about 190° C. and forms a char at temperatures above 600° C. to yield at least 30 to 80 weight percent of the char based on the weight of the polycyanurate matrix, wherein said formation of said char releases 1 to about 30 J/g-K. In embodiments, the cure catalyst is selected from; at least one monofunctional or polyfunctional phenol from C6 to C20 with OH groups ranging from one to ten and a concentration ranging from 0.005% to 5% by weight of the cyanate-ester monomer; at least one organometallic compound having Ni, Cu, Co, Fe, and Mn and a concentration ranging from 0.005% to 5% by weight of the cyanate-ester monomer, and any combination thereof.

In embodiments, the cyanate ester and substrate are sandwiched by reduced pressure by ranging from 1 to about 100 Torr and heated from about 100° C. to about 400° C. In embodiments, the structural polycyanurate-substrate composite is produced by a process selected from the group consisting of vacuum-assisted resin-transfer molding, resin-film infusion, filament-wetting/drawing, tape-wetting/drawing, resin-transfer molding and compressive molding. In embodiments, the structural polycyuranate-substrate composite is produced to have at least one polycyuranate as an outermost layer of the substrate composite material. In embodiments, the structural polycyuranate-substrate composite is produced to form the electrically non-conductive outermost layer including the polycyuranate and non-carbon fiber, where the structural polycyuranate-substrate composite is resistant to galvanic corrosion. In embodiments, the structural polycyuranate-substrate composite is produced to form the fire resistant outermost layer consisting of the polycyuranate and non-carbon electrically non-conductive fiber.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A fiber reinforced composite material, comprising:
   at least one outermost layer is a polycyanurate matrix having at least one cured cyanate ester monomer associating with at least one non-carbon based fiber(s);
   at least two inner layers having a fiber reinforced composite; and
   at least one cure catalyst in the cyanate ester monomers, wherein said combined polycyanurate/fiber reinforced composite produce a galvanic-corrosion resistant and fire-resistant composite material.

2. The material according to claim 1, wherein said cured cyanate ester monomers are at least one cure catalyst or thermally cured.

3. The material according to claim 1, wherein said fiber reinforced composite is selected from the group consisting of cured thermosetting resins including bismaleimide (BMI), cyanate esters, end-capped polyimides, other end-capped oligomers, benzoxazines, and epoxies, and thermoplastic resins including polyetheretherketones (PEEK), polycarbonates, polyimides, polyetherimides, polyethersulfones, polyphenyl sulfides, polyamides, thermoplastics, phenolic, vinylester, polyester, lignin-based resin, aramid, imide, polyether-imide, polyamide, and polyether-ether-ketone, and copolymers, and any combinations thereof.

4. The material according to claim 1, wherein said polycyanurate matrix is polymerized from one or more bifunctional or polyfunctional cyanate ester monomers, wherein said one or more bifunctional or polyfunctional cyanate ester monomers are selected from the structural formula A, B, C, D, and E:

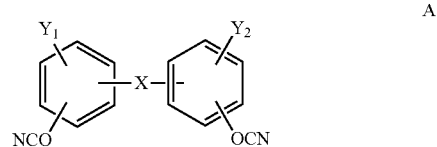

A wherein X is selected from the group consisting of methylene, functionalized methylene, ethylene, functionalized ethylene, isopropylene, functionalized isopropylene, alkylene and functionalized alkylene;
wherein at least one $Y_1$ and at least one $Y_2$ are OCN;
wherein at least one $Y_1$ and at least one $Y_2$ are independently selected from the group consisting of hydrogen, alkyl, functionalized alkyl, alkenyl, functionalized alkenyl, aryl and functionalized aryl; and
wherein said monomer is liquid at temperatures greater than 18° C. and/or has a melting point less than about 150° C.

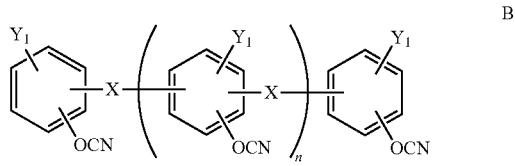

B wherein X is selected from the group consisting of methylene, functionalized methylene, ethylene, functionalized ethylene, isopropylene, functionalized isoproplyene, alkylene and functionalized alkylene;
wherein at least one $Y_1$ is OCN;
wherein at least one $Y_1$ is independently selected from the group consisting of hydrogen, alkyl, functionalized alkyl, alkenyl, functionalized alkenyl, aryl and functionalized aryl; and
wherein said monomer is liquid at temperatures greater than 18° C. and/or has a melting point less than 150° C.;

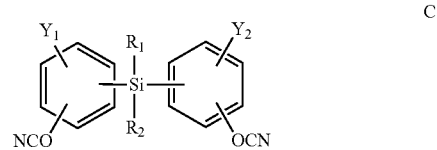

C wherein at least one $Y_1$ and at least one $Y_2$ are OCN;
wherein at least one $Y_1$, at least one $Y_2$, at least one $R_1$ and at least one $R_2$ are independently selected from the group consisting of hydrogen, alkyl, functionalized alkyl, alkenyl, functionalized alkenyl, aryl, and functionalized aryl; and wherein said monomer is liquid at temperatures greater than 18° C. and/or has a melting point less than about 150° C.

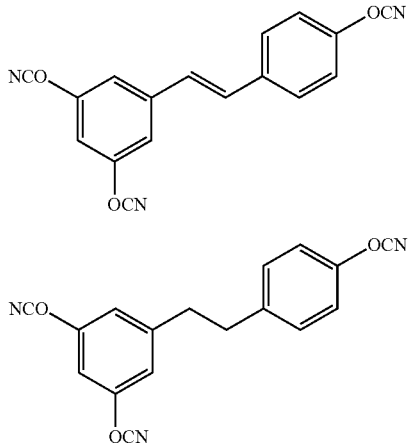

5. The material according to claim 1, wherein said non-carbon based fiber(s) is electrically non-conductive.

6. The material according to claim 1, wherein said outermost layer of said polycyanurate matrix further comprises at least one flame-retarding additive selected from a group of organophosphates, metal hydroxides, hydrated metal oxides, other metal oxides, mineral carbonates, mineral borates, clays, and halogenated compounds.

7. The material according to claim 5, wherein said non-carbon based electrically non-conductive fiber(s) is selected from the group consisting of silicon oxide, S-glass, E-glass, zirconium oxide, other oxides, boron nitride, nitrides, mineral fibers, ceramic material, and any combinations thereof.

8. The material according to claim 1, wherein said at least one non-carbon based fiber(s) occupies a total volume fraction in the range of about 30% to about 80% to the polycyanurate matrix layer.

9. The material according to claim 1, wherein said outermost layer of said polycyanurate matrix including said at least one non-carbon based electrically non-conductive fiber is selected from the group consisting of chopped, continuous, uniaxial, tape, biaxial, non-woven matte, woven fabric, stitched fabric, and knitted fabric.

10. The material according to claim 3, wherein said fiber-reinforced composites are cured bismaleimide (BMI) fiber-reinforced composites with carbon-based fiber or are prepegs.

11. The material according to claim 3, wherein said fiber-reinforced composites are cured bismaleimide (BMI) fiber-reinforced composites with carbon-based fiber(s) selected from the group consisting of chopped, continuous, uniaxial, tape, biaxial, non-woven matte, woven fabric, stitched fabric, knitted fabric and honeycomb structures.

12. The material according to claim 3, wherein said outermost layer of said polycyanurate matrix having a glass transition temperature greater than about 190° C. and forms a char at temperatures above 600° C. to yield at least 30 to 80 weight percent of said char based on the weight of said polycyanurate matrix, wherein said formation of said char releases 1 to about 30 J/g-K.

13. The material according to claim 2, wherein said cure catalyst is selected from; at least one monofunctional or polyfunctional phenol from C6 to C20 with OH groups ranging from one to ten and a concentration ranging from 0.005% to 5% by weight of the cyanate-ester monomer; at least one organometallic compound having Ni, Cu, Co, Fe, and Mn and a concentration ranging from 0.005% to 5% by weight of the cyanate-ester monomer, and any combination thereof.

14. A method for manufacturing polymer matrix resin composite materials, comprising:
impregnating at least one ply of non-carbon based fiber with a mixture of at least one cyanate ester monomer and at least one cure catalyst;
laying at least one cyanate ester prepeg ply onto at least one second ply of fiber composite substrate;
applying reduced pressure to said cyanate ester and a substrate; and
heating to cure and bond said cyanate ester/ply onto said substrate.

15. The method according to claim 14, wherein said fiber reinforced substrate is selected from the group consisting of cured thermosetting resins including bismaleimide (BMI), cyanate esters, end-capped polyimides, other end-capped oligomers, benzoxazines, and epoxies, and thermoplastic resins including polyetheretherketones (PEEK), polycarbonates, polyimides, polyetherimides, polyethersulfones, polyphenyl sulfides, polyamides, other thermoplastics, copolymers, and any combinations thereof.

16. The method according to claim 15, wherein said the cyanate ester and substrate are sandwiched by reduced pressure by ranging from 1 to about 100 Torr and heated from about 100° C. to about 400° C.

17. The method according to claim 15, wherein said structural polycyanurate-substrate composite is produced by a process selected from the group consisting of vacuum-assisted resin-transfer molding, resin-film infusion, filament-wetting/drawing, tape-wetting/drawing, resin-transfer molding and compressive molding.

18. The method according to claim 15, wherein said structural polycyuranate-substrate composite is produced to have said at least one polycyuranate as an outermost layer of said substrate composite material.

19. The method according to claim 15, wherein said structural polycyuranate-substrate composite is produced to form said electrically non-conductive outermost layer including said polycyuranate and non-carbon fiber, wherein the structural polycyuranate-substrate composite is resistant to galvanic corrosion.

20. The method according to claim 15, wherein said structural polycyuranate-substrate composite is produced to form said fire resistant outermost layer consisting of said polycyuranate and non-carbon electrically non-conductive fiber.

* * * * *